UNITED STATES PATENT OFFICE.

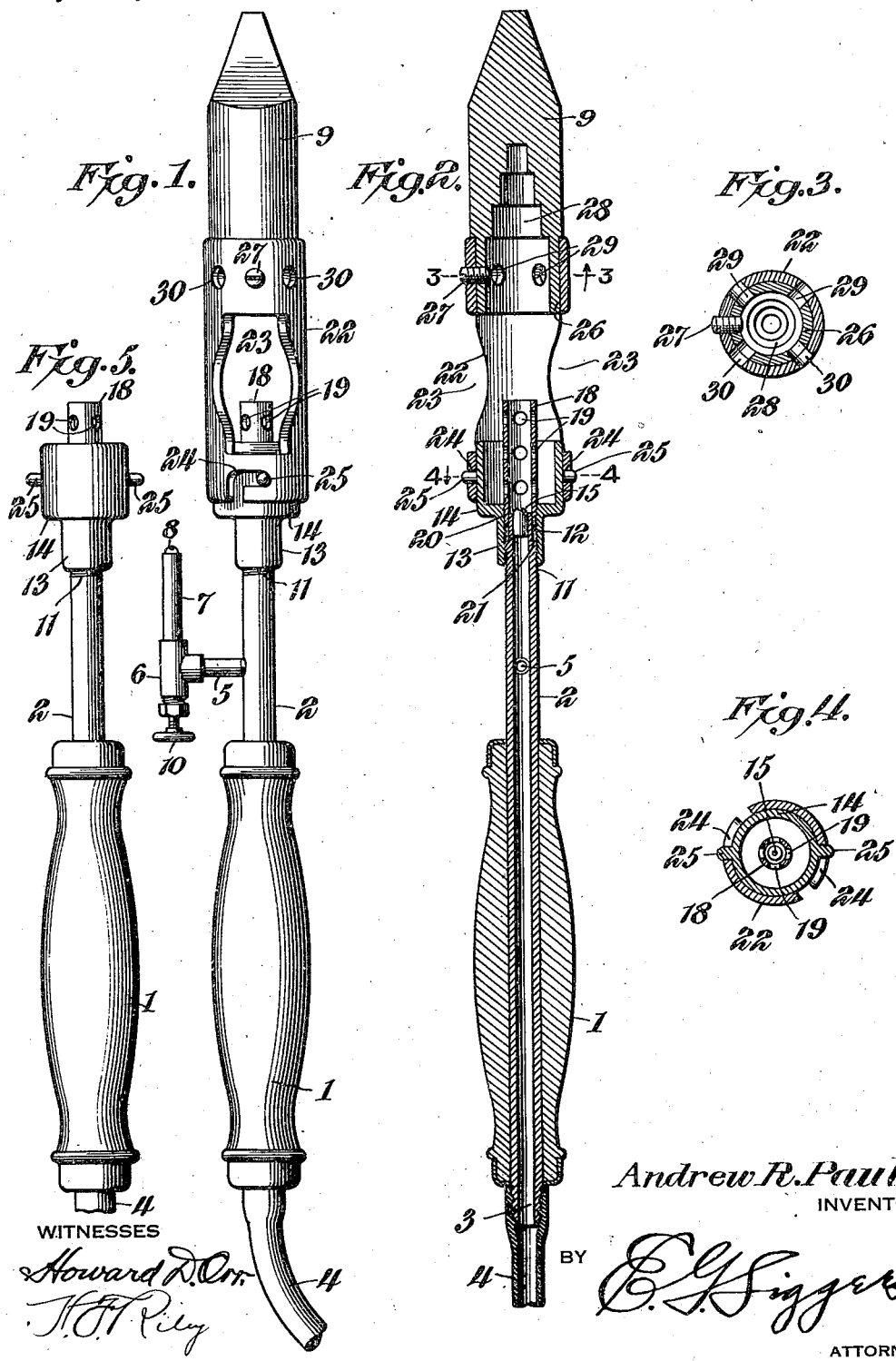

ANDREW R. PAUL, OF SOMERSET, PENNSYLVANIA.

SOLDERING-IRON.

1,132,969.

Specification of Letters Patent.   Patented Mar. 23, 1915.

Application filed February 6, 1914.   Serial No. 817,002.

*To all whom it may concern:*

Be it known that I, ANDREW R. PAUL, a citizen of the United States, residing at Somerset, in the county of Somerset and State of Pennsylvania, have invented a new and useful Soldering-Iron, of which the following is a specification.

The invention relates to improvements in soldering irons.

The object of the present invention is to improve the construction of soldering irons and to provide an exceedingly simple, practical, and inexpensive soldering iron designed for the use of tinners, plumbers, metallic workers, and others, and adapted particularly for outside work upon roofs and other places and constructed for using acetylene and similar gaseous fuel under pressure, and capable of developing a strong blast of heat and of delivering the same interiorly of the head of the soldering iron, whereby the latter is quickly heated and is maintained at a high temperature.

A further object of the invention is to provide a soldering iron adapted to be instantly converted into a blow torch and equipped with means for throwing a light over the end of the soldering iron head when desired, without interfering with the operation of the heating means.

With these and other objects in view the invention consists in the construction and novel combination of parts hereinafter fully described, illustrated in the accompanying drawings, and pointed out in the claims hereto appended, it being understood that various changes in form, proportion, size and minor details of construction, within the scope of the claims, may be resorted to without departing from the spirit or sacrificing any of the advantages of the invention.

In the drawing: Figure 1 is a side elevation of a soldering iron constructed in accordance with this invention. Fig. 2 is a longitudinal sectional view of the same. Fig. 3 is a transverse sectional view on the line 3—3 of Fig. 2. Fig. 4 is a similar view on the line 4—4 of Fig. 2. Fig. 5 is a side elevation of the tool, the head of the soldering iron being removed to convert it into a blow torch.

Like numerals of reference designate corresponding parts in all the figures of the drawings.

In the accompanying drawing, in which is illustrated the preferred embodiment of the invention, the soldering iron comprises in its construction a hollow handle 1 secured on the inner portion of a tubular stem 2, constituting a gas supply pipe and designed to be connected with a gas tank (not shown), or any other suitable source of gaseous fuel supply, the tool being designed especially for the use of such fuel. The tubular stem extends inwardly or rearwardly beyond the handle 1 and its inner or rear end 3 is provided with exterior annular grooves or corrugations and is adapted to receive one end of a rubber tube 4 or other flexible connection for connecting the soldering iron with the prest-o-lite or other gas tank. The outer portion of the tubular stem is tapped at a point slightly beyond the handle 1 to receive a lateral branch 5 which is connected by a T-coupling 6 with a longitudinal tube 7 carrying a burner tip 8 of the ordinary construction. The burner formed by the longitudinal tube 7 and the tip 8 is adapted to throw a strong light over the head 9 of the soldering iron, and enables the latter to be conveniently and accurately used in dark corners and various other places where a light is necessary, and where a candle is ordinarily employed for such purpose. The coupling 6 is equipped with a suitable valve 10 for controlling the flow of gas to the said burner. The tubular stem 2 has a threaded portion 11 adjacent to its front end 12 to screw into an interiorly threaded neck 13 of a cup-shaped support 14. The outer end 12 of the tubular stem or supply pipe receives a suitable tip 15 which discharges the gas into a burner tube 18 having a greater diameter than the discharge orifice of the tip 15, and provided with perforations 19 arranged at intervals and forming lateral air inlet openings which permit the air to be drawn or sucked into the burner tube by the gas passing through the same. This causes a mixing of the air and gas at the point of ignition and results in perfect combustion, producing a blast and a flame and enabling the device to be used as a blow torch when the head of the soldering iron is removed.

The tip 15, which is removable, is adapted, when necessary, to be readily renewed, but instead of employing a tip of the particular form shown, the supply tube may be provided at its outer end with any other form of jet aperture for discharging the gaseous fuel into the burner tube. The inner end 20 of the burner tube is exteriorly threaded and screws into the interiorly threaded neck 13 of the cup-shaped support 14, and the outer end 12 of the combined tubular stem and supply pipe is reduced and extends into the inner end of the burner tube, presenting a smooth exterior face to the same. The inner end of the burner tube is spaced from the shoulder 21, formed by reducing the outer end of the stem 2, and the said spacing of the burner tube and the shoulder permits a relative adjustment of the parts, in order to enable the tip to be arranged in proper position with relation to the burner tube. The threaded engagement of the burner tube and the combined stem and supply pipe with the neck of the cup-shaped support retains the said parts in their adjustment.

The sides or walls of the cup-shaped support are cylindrical and are spaced from the burner tube 18 to permit ready access of air to the apertures 19, and the said support receives a coupling sleeve 22 which carries the head 9 of the soldering iron. The sleeve 22 consists of inner and outer annular portions and longitudinal connecting portions which are spaced apart to provide opposite openings 23 for the admission of air to the burner tube 18 to support combustion. The burner tube 18 extends beyond the cup-shaped support and its outer portion is exposed at the side openings 23 of the sleeve 22. The inner annular portion of the sleeve 22 is provided with opposite L-shaped bayonet slots 24 consisting of a longitudinal entrance branch and an inner transverse branch and adapted to engage opposite projections 25 mounted on the cup-shaped support. By this construction the sleeve 22, which carries the soldering iron head 9, is detachably interlocked with the cup-shaped support and may be easily and quickly applied thereto and removed therefrom to convert the instrument into either a soldering iron or a blow torch.

The soldering iron head 9, which is provided with a tapered outer portion, has its inner end 26 exteriorly recessed and secured within the outer annular portion of the coupling sleeve 22 by a screw 27 or other suitable fastening device. The inner portion of the head 9 is provided with a chamber 28 tapered toward the outer end of the head 9 and adapted to present a relatively large amount of heating surface to the flame of the blow torch or heating burner of the soldering iron. The said chamber 28 is provided with lateral outlets 29 extending through the walls of the chamber and registering with openings 30 in the outer annular portion of the sleeve 22. In the operation of the soldering iron the gas from the supply tank is discharged directly into the burner tube and does not mix with the air until it enters the said tube, and there is no liability of loss of gas by exposing the same to the air prior to ignition, and furthermore, a heavy wind or draft will not extinguish the heating burner, so that the soldering iron is especially adapted to be used on roofs and other exposed places, as well as in-doors. Also, the illuminating burner carried by the lateral branch of the supply pipe, while extending outwardly in the direction of the soldering iron head, terminates short of the cup-shaped portion of the support and is not in the way when the tool is used either as a soldering iron or a blow torch.

What is claimed is:

1. A tool of the class described comprising a handle, a tubular stem carried by the handle and constituting a supply pipe, said tubular stem being provided at its outer end with a jet aperture, a relatively short burner tube located at the outer end of the supply pipe in position to receive directly therefrom the fuel discharged from the jet aperture, said burner tube being provided at all of its sides and throughout its entire length with lateral air inlet openings and forming a blow torch, and a soldering iron support carried by the stem and having imperforate walls spaced from and surrounding the burner tube, said support terminating short of the outer end of the burner tube and exposing a portion of the same.

2. A tool of the class described comprising a tubular stem constituting a supply pipe and provided at its outer end with a jet aperture, a short burner tube located at the outer end of the tubular stem in position to receive directly the fuel discharged from the jet aperture and provided with lateral air inlet openings, a support mounted on the tubular stem and having a tubular portion surrounding the burner tube in spaced relation with the same and terminating short of the front end thereof, a soldering iron head located in advance of the burner tube, and means for connecting the soldering iron head with the said tubular supporting portion.

3. A tool of the class described, including a supply pipe provided at its outer end with a jet aperture, a cup-shaped support having a reduced neck receiving the outer end of the supply pipe, a burner tube located at the outer end of the supply pipe in position to receive the fuel discharged from the jet aperture and having lateral air inlet openings, said burner tube being mounted on the support in spaced relation with the sides thereof, a soldering iron head located in advance of the burner tube, and a coupling sleeve carrying the soldering iron and detachably fitted on the cup-shaped support.

4. A tool of the class described including a fuel supply pipe provided at its outer end with a jet aperture and having a lateral branch extending from it in rear of the jet aperture, a burner tube located at the outer end of the supply pipe in position to receive the fuel discharged from the jet aperture and provided with lateral air inlet openings, a soldering iron head, means for supporting the soldering iron head in advance of the burner tube, and an illuminating burner carried by the said lateral branch and extending forwardly in a direction longitudinal of the tool and in position to throw light over the soldering iron head.

5. A tool of the class described comprising a tubular stem constituting a supply pipe and provided at its outer end with a jet aperture, an imperforate tubular support having an inner reduced portion secured to and extending beyond the stem, a burner tube secured within the said reduced tubular portion of the support and extending outwardly from the stem and forming a continuation of the same, said support having an outer enlarged tubular portion surrounding the burner tube in spaced relation with the same and terminating short of the front end thereof.

6. A tool of the class described comprising a handle, a tubular stem carried by the handle and constituting a supply pipe, a tip fitted in the outer end of the supply pipe and having a jet aperture, a relatively short burner tube located at the outer end of the supply pipe in position to receive directly therefrom the fuel discharged from the jet aperture, said burner tube being provided at all of its sides and throughout its entire length with lateral air inlet openings and forming a blow torch, and means for connecting the inner end of the burner tube with the discharge pipe, said means having imperforate walls at such connection.

In testimony that I claim the foregoing as my own, I have hereto affixed my signature in the presence of two witnesses.

ANDREW R. PAUL.

Witnesses:
JOHN H. SIGGERS,
EDITH L. BROWN.